United States Patent [19]

Kohsaka et al.

[11] Patent Number: 5,276,301
[45] Date of Patent: Jan. 4, 1994

[54] WIRE ELECTRIC DISCHARGE MACHINE HAVING FUNCTION FOR COUNTING NUMBER OF DISCHARGE TIMES

[75] Inventors: Kunio Kohsaka; Akihiro Komori, both of Nagoya, Japan

[73] Assignee: Brother Kogyo Kabushiki Kaisha, Nagoya, Japan

[21] Appl. No.: 44,713

[22] Filed: Apr. 12, 1993

[30] Foreign Application Priority Data

May 1, 1992 [JP] Japan .................. 4-112884

[51] Int. Cl.$^5$ ............................................. B23H 7/04
[52] U.S. Cl. .................................................. 219/69.12
[58] Field of Search ............... 219/69.12, 69.13, 69.17, 219/69.18, 69.19

[56] References Cited

U.S. PATENT DOCUMENTS

| | | | |
|---|---|---|---|
| 3,623,148 | 11/1971 | Berghausen | 219/69.13 |
| 4,673,789 | 6/1987 | Ozaki et al. | 219/69.12 |
| 4,695,696 | 9/1987 | Ozaki et al. | 219/69.18 |
| 4,703,144 | 10/1987 | Goto et al. | 219/69.18 |

*Primary Examiner*—Geoffrey S. Evans
*Attorney, Agent, or Firm*—Oliff & Berridge

[57] ABSTRACT

In a wire electric discharge machine, a permissible discharge frequency is calculated on the basis of an average discharge frequency per unit time which is estimated on the basis of a target inter-electrode voltage or a detected average inter-electrode voltage and a discharge period. The number of times a discharge is actually induced between a wire electrode and a workpiece every unit time is counted and the application of a pulse-shaped voltage is ceased for a residual time of the unit time by a control device when the discharge frequency exceeds the permissible discharge frequency.

10 Claims, 6 Drawing Sheets

|       | START |
|-------|-------|
| S110  | READ IN DISCHARGE PERIOD AND TARGET INTER-ELECTRODE VOLTAGE |
| S120  | ESTIMATE AVERAGE DISCHARGE FREQUENCY {Nc} |
| S130  | START TIMER (T ← 0) |
| S140  | N ← α * Nc |
| S150  | ALLOW DISCHARGE |
| S160  | DISCHARGE DETECTED ? |
| S170  | N ← N-1 |
| S180  | N = 0 ? |
| S190  | PROHIBIT DISCHARGE |
| S200  | T > Δt |
| S210  | PROCESSING ENDED ? |
|       | END |

Fig.3

| | → TARGET INTER-ELECTRODE VOLTAGE [V] | | | | |
|---|---|---|---|---|---|
| | 30 | 40 | 50 | 60 | ... |
| 6 | 53 | 42 | 33 | 24 | ... |
| 8 | 51 | 41 | 32 | 23 | ... |
| 10 | 45 | 37 | 29 | 21 | ... |
| 12 | 38 | 32 | 25 | 18 | ... |
| 15 | 31 | 26 | 21 | 15 | ... |
| ... | ... | ... | ... | ... | ... |

↓ DISCHARGE PERIOD [μSEC]

Fig.4

WIRE ELECTRIC DISCHARGE MACHINE HAVING FUNCTION FOR COUNTING NUMBER OF DISCHARGE TIMES

BACKGROUND OF THE INVENTION

1. Field of the Invention

The invention relates to a wire electric discharge machine for processing a workpiece (an object to be processed) by repetitively inducing a pulse-shaped discharge between a wire electrode and the workpiece.

2. Description of Related Art

In the conventional wire electric discharge machine, a pulse voltage is applied between a wire electrode and a workpiece by a power source to repetitively induce a pulse-shaped discharge between the wire electrode and the workpiece, whereby the processing of the workpiece is performed.

However, the above type of wire electric discharge machine has the problem that the wire electrode is broken when there is a frequent occurrence of abnormal discharge, having an extremely short no-load time, in which the discharge occurs between the wire electrode and the workpiece simultaneously with the application of a pulse voltage by the processing power source.

In order to solve the above problem, a method, as disclosed in U.S. Pat. No. 4,695,696, which corresponds to Japanese Patent Publication No. 2-44648, has been proposed. In this method, each discharge pulse generated between the wire electrode and the workpiece is discriminated as an abnormal discharge pulse or a normal discharge pulse on the basis of the length of the no-load time and, when an abnormal discharge pulse having short no-load time occurs, the pulse height of discharge current is reduced or a rest time for a pulse voltage supply operation is made longer to thereby reduce the discharge energy supplied between the wire electrode and the workpiece by the processing power source. In that manner, breakage of the wire electrode is avoided.

However, even when the normal discharge is induced, a so-called abnormal discharge pulse having short no-load time is very frequently actually generated.

Figure 4:
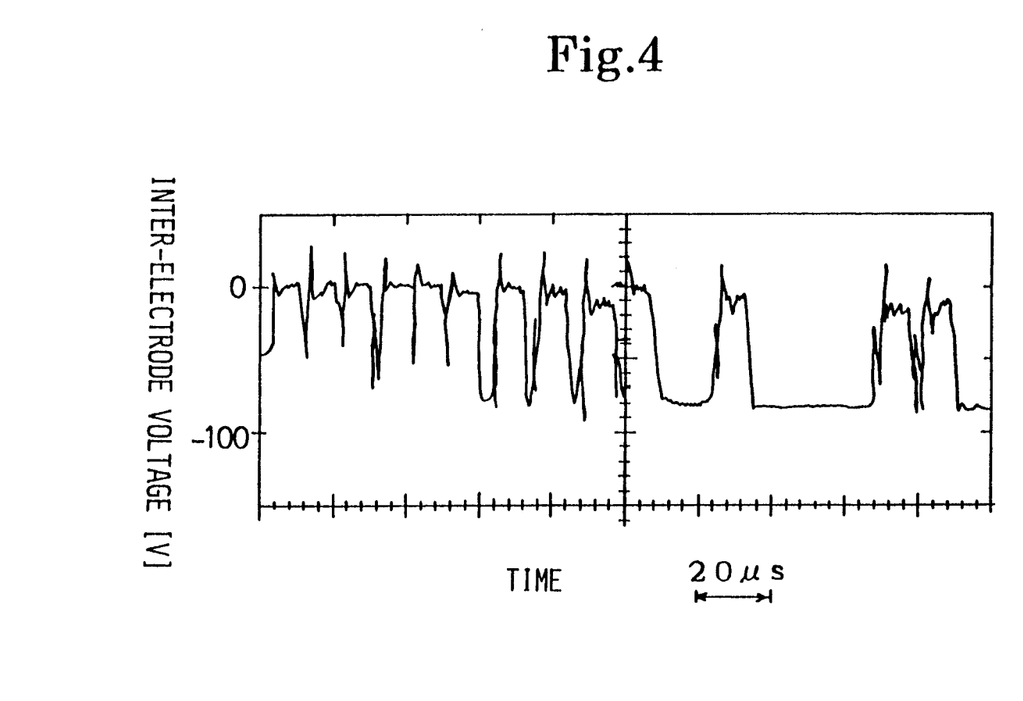
FIG. 4 is a graph showing a voltage waveform between a wire electrode and a workpiece to be processed.

FIG. 4 shows a typical example of a voltage waveform between the wire electrode and the workpiece to be processed.

In a graph of FIG. 4, the ordinate represents an inter-electrode voltage while the abscissa represents a time. The graph shows time-variation of the potential of the wire electrode with respect to the workpiece when the workpiece is connected to the earth such that it serves as a positive electrode side. As is apparent from FIG. 4, a number of so-called abnormal discharge pulses having short no-load time, as disclosed in U.S. Pat. No. 4,695,696, occur even when the normal discharge is induced. According to an experiment of the inventors of this application, it has been experimentally proven that a generally-defined abnormal discharge pulse is contained in an amount of about 15 to 40% of all discharge pulses even during the normal discharge operation. Therefore, if each discharge pulse is discriminated as an abnormal discharge pulse or a normal discharge pulse on the basis of only the no-load time and the discharge energy supplied between the wire electrode and the workpiece is reduced for every discrimination of the abnormal discharge pulse, it is obvious to conclude that processing speed is also reduced.

In addition, it is unreasonable, in principle, that the abnormal discharge pulses be defined on the basis of only the no-load time. That is, the judgment of abnormality or normality is originally dependent on various conditions, such as a sectional area of the wire electrode, material of the wire electrode, wire tension, discharge energy per shot, and a discharge period. Thus it is impossible to set a fixed threshold level for the no-load time. If the judgment (discrimination) of abnormality or normality is daringly made on the basis of the no-load time irrespective of the above fact, there would occur a case where the processing speed is reduced or a function of preventing the breaking of wires does not normally work when the wire electrode is changed to one having a different structure, or a processing condition such as a discharge period for a target (desired) inter-electrode voltage between the wire electrode and the workpiece to be processed is altered.

SUMMARY OF THE INVENTION

An object of the invention is to provide a wire electric discharge machine that is capable of preventing breakage of the wire electrode while maintaining the inter-electrode voltage substantially constant.

A second object of this invention is to provide a wire electric discharge machine capable of preventing the breaking of the wire electrode without reducing the processing speed.

In order to attain the above objects, the wire electric discharge machine according to the invention, comprises processing condition setting means for setting information on a workpiece and processing conditions, discharge control means for applying a pulse-shaped voltage between a wire electrode and the workpiece on the basis of a discharge period which is set by the processing condition setting means, inter-electrode voltage detection means for detecting an average inter-electrode voltage between the wire electrode and the workpiece, relative-movement means for relatively moving the wire electrode and the workpiece, and moving speed control means for controlling the relative moving speed between the wire electrode and the workpiece so that a one of the average inter-electrode voltage detected by the inter-electrode voltage detection means is made equal to the target inter-electrode voltage set in the processing condition setting means and the relative moving speed between the wire electrode and the workpiece is made equal to a feeding speed set in the processing condition setting means, and the wire electric discharge machine is so designed as to repetitively induce pulse-shaped discharges between the wire electrode and the workpiece to perform a processing of the workpiece, wherein the moving speed control means is equipped with discharge frequency estimating means for estimating an average discharge frequency (the average number of times of discharge) per unit time on the basis of the target inter-electrode voltage which is set by the processing condition setting means when the moving speed control means controls the relative moving speed so that the average inter-electrode voltage is equal to the target inter-electrode voltage and the average inter-electrode voltage which is detected by the inter-electrode voltage detection means when the moving speed control means controls the relative moving speed to be equal to the feeding speed set by the processing condition setting means, and the discharge period which is set by the processing condition setting means, permissible discharge-frequency calculating means for calculating the permissible maximum discharge frequency per unit time on the basis of the average discharge frequency per unit time which is estimated by the discharge frequency estimating means, discharge detection means for detecting discharge which is actually induced between the wire electrode and the workpiece, and discharge ceasing means for counting the number of times (frequency) of the discharge which is detected by the discharge detection means every unit time, and ceasing the application of the pulse-shaped voltage by the discharge control means for a residual time of the unit time when the discharge frequency reaches the permissible discharge frequency which is calculated by the permissible discharge frequency calculating means.

In the wire electric discharge machine of the invention thus structured, information about the workpiece and the processing conditions, such as the target inter-electrode voltage, the feeding speed, the discharge period, and the material of the wire electrode, are first set by the processing condition setting means. Here, the discharge period is a parameter for determining a time interval of discharge between the wire electrode and the workpiece (the reciprocal of the discharge period is not simply equal to the number of discharge pulses because there occurs a case where no discharge is induced irrespective of the presence of instruction of the discharge), and the target inter-electrode voltage is a voltage between the wire electrode and the workpiece, that is, a target (desired) value of the inter-electrode voltage. If these values are set to be large values, the wire electrode rarely breaks, but the processing speed is reduced. Conversely, if these values are set to small values, the processing speed is increased, but the wire electrode is liable to be broken due to the concentration of discharge current.

Subsequently, the discharge control means applies the pulse-shaped voltage between the wire electrode and the workpiece on the basis of the discharge period which is set by the processing condition setting means and the inter-electrode voltage detection means detects the average inter-electrode voltage between the wire electrode and the workpiece.

On the other hand, the moving speed control means controls the relative moving speed between the wire electrode and the workpiece, which are relatively moved by the relative movement means, so that the average inter-electrode voltage detected by the inter-electrode voltage detection means is made equal to the target inter-electrode voltage set by the processing condition setting means or the relative moving speed is made equal to the feeding speed set by the processing condition setting means. Subsequently, the pulse-shaped discharge is repetitively induced between the wire electrode and the workpiece to perform the processing of the workpiece.

Upon the start of the above processing, the discharge frequency estimating means estimates an average discharge frequency (the average number of times of discharge) per unit time on the basis of the target inter-electrode voltage which is set by the processing condition setting means when the moving speed control means controls the relative moving speed so that the average inter-electrode voltage is equal to the target inter-electrode voltage or the average inter-electrode voltage which is detected by the inter-electrode voltage detection means when the moving speed control means control the relative moving speed to be equal to the feeding speed set by the processing condition setting means and the discharge period which is set by the processing condition setting means. The permissible discharge-frequency calculating means calculates the permissible maximum discharge frequency per unit time on the basis of the average discharge frequency per unit time which is estimated by the discharge frequency estimating means. Further, the discharge detection means detects the discharge which is actually induced between the wire electrode and the workpiece.

Subsequently, the discharge ceasing means counts the number of times (frequency) of the discharge detected by the discharge detection means every unit time, and ceases the application of the pulse-shaped voltage by the discharge control means for the residual time of the unit time when the discharge frequency reaches the permissible discharge frequency which is calculated by the permissible discharge frequency calculating means.

As described above, the application of the pulse-shaped voltage by the discharge control means is ceased for the residual time of the unit time when the discharge whose frequency exceeds the permissible discharge frequency occurs every unit time. The reason for this ceasing operation of the voltage application will be hereunder described with reference to FIG. 5.

Figure 5:
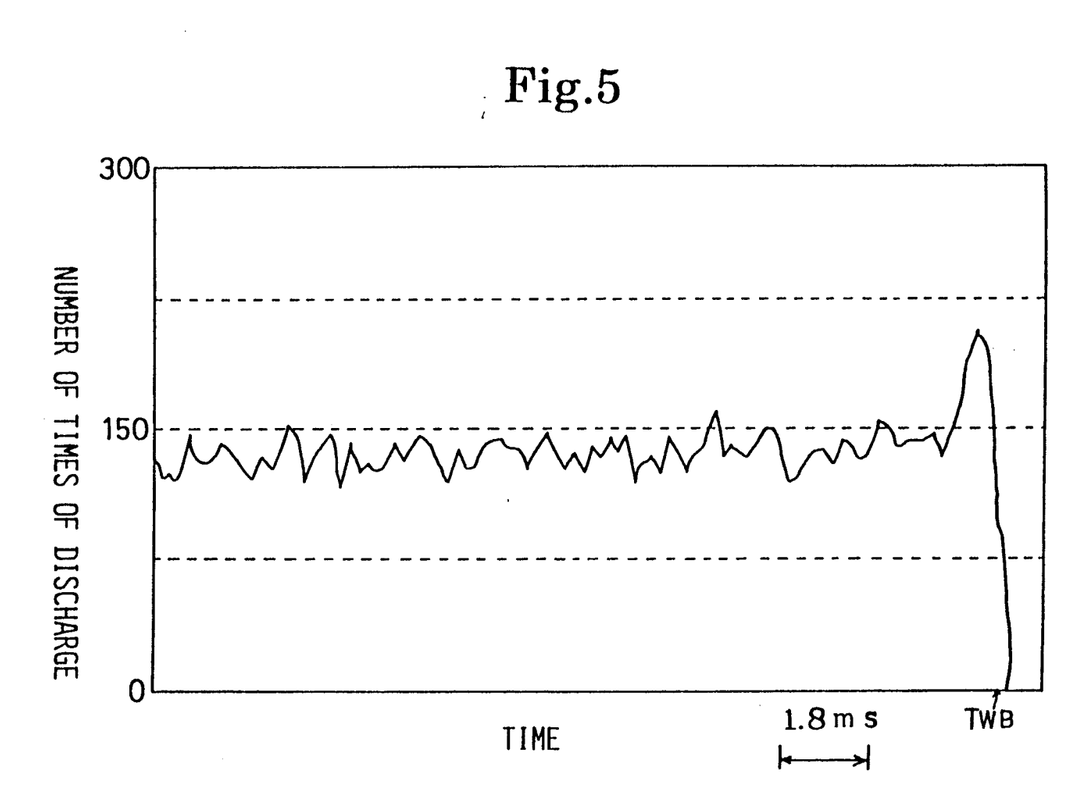
FIG. 5 is a graph showing a discharge concentration phenomenon which causes the breakage of the wire electrode.

FIG. 5 is a graph showing a discharge concentrating phenomenon before a wire electrode is broken. The ordinate of the graph represents the frequency (the number of times) of discharge, and the abscissa thereof represents time. The graph shows the time-variation of a value which is counted at a period of 1.8 ms. In FIG. 5, TWB represents a time at which the instant of the breakage of the wire electrode is electrically detected. As is apparent from FIG. 5, it is found that the frequency of the discharge is rapidly increased several milli-seconds before the break time. That is, the concentration of the discharge occurs before the breakage.

Therefore, a permissible discharge frequency per unit time is calculated so as to prevent the concentration of the discharge, as described above, and prevent the processing speed from being reduced to a non-permissible value, and an over-discharge which exceeds the above permissible discharge frequency is forbidden to prevent the breaking of the wire electrode.

BRIEF DESCRIPTION OF THE DRAWINGS

The invention will be described with reference to the Figures, in which.

DETAILED DESCRIPTION OF PREFERRED EMBODIMENT

Figure 1:
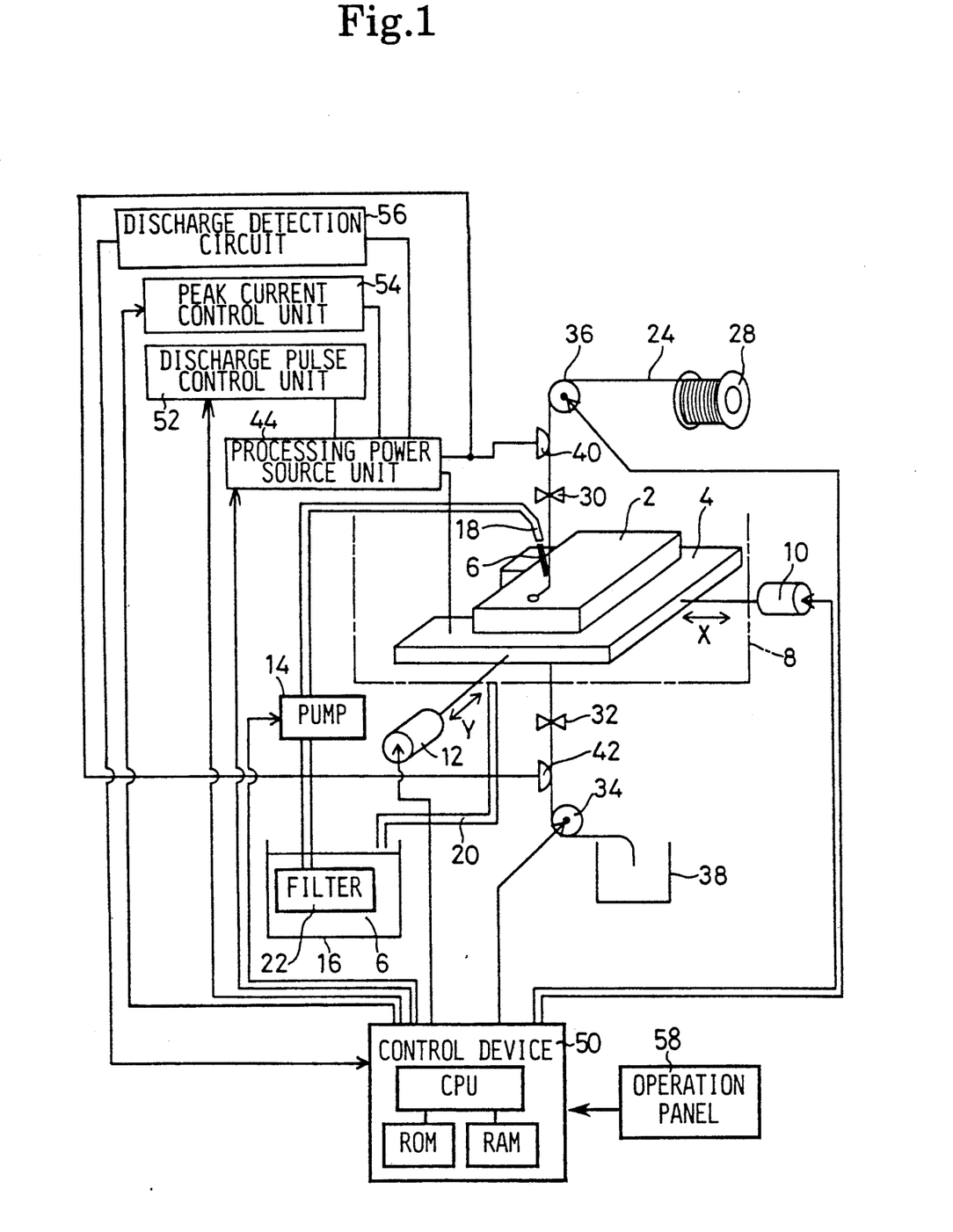
FIG. 1 is a schematic diagram showing the construction of a wire electric discharge machine of an embodiment according to the invention.

A preferred embodiment according to the invention will be described hereunder with reference to the accompanying drawings. FIG. 1 is a schematic diagram showing the structure of a wire electric discharge machine to which the invention is applied.

As shown in FIG. 1, the wire electric discharge machine of this embodiment is equipped with a movable table 4 to which a workpiece 2 to be processed is fixed. The movable table 4 is disposed inside of a processing tank 8 storing processing liquid 6 therein, and is moved in X-axial direction and Y-axial direction by an X-axis servo motor 10 and a Y-axis servo motor 12, respectively.

The processing liquid 6 is pumped from a processing liquid tank 16 by a pump 14, supplied through a processing liquid supply unit 18 to a processing portion of the workpiece 2, and then stored in the processing tank 8. The used processing liquid 6, that overflows from the processing tank 8, is returned through a discharge pipe 20 to the processing liquid tank 16, passed through a filter 22 for filtration and then again pumped by the pump 14.

A wire electrode 24 for processing the workpiece 2 is drawn from a wire bobbin 28 and supported by an upper wire guide 30 and a lower wire guide 32, which are disposed at the upper and lower sides of the workpiece 2. The wire electrode 24 is moved with its tension maintained by a wire driving motor 34 and a tension roller 36, and the used wire electrode 2 is discharged to a waste-wire discharge portion 38. In addition, upper and lower voltage supply units 40 and 42 for applying a pulse-shaped voltage for discharge (hereinafter referred to as "pulse voltage") to the wire electrode 24, are disposed in a moving passageway located above the upper wire guide 30 and in a moving passageway located below the lower wire guide 32. The voltage supply units 40 and 42 are connected to a processing power source unit 44. A pulse voltage is applied between each of the voltage supply units 40, 42 and the movable table 4 from the processing power source unit 44 to induce a discharge between the wire electrode 24 and the workpiece 2, whereby the workpiece 2 is processed.

The processing power source unit 44 is connected a discharge pulse control unit 52 and a peak current control unit 54 for respectively controlling the generation interval (discharge period) and the peak current of a pulse signal, which is generated, to allow the generation of a discharge in accordance with a control signal from a control device 50. The control device 50 also connected to a discharge detection circuit 56 serving as inter-electrode detection means for detecting the discharge and the average inter-electrode voltage (hereinafter referred to as "inter-electrode voltage") between the wire electrode 24 and the workpiece 2.

The control device 50 comprises a well-known microcomputer mainly including a CPU, a ROM, and a RAM. The control device 50 serves to output control signals and is connected to an operation panel 58 which serves as the processing condition setting means, to the X-axis servo motor 10, the Y-axis servo motor 12, the pump 14, the wire driving motor 34, the tension roller 36, the processing power source unit 44, the discharge pulse control unit 52, and the peak current control unit 54 on the basis of the various processing conditions (that is, material of the workpiece 2, the shape of the workpiece 2, a discharge period, the target inter-electrode voltage, and the inter-electrode voltage detected by the discharge detection circuit 56) to thereby control the driving of the above elements.

That is, the control device 50 serves to carry out the following control operations:

(1) A discharge period control operation as the discharge control means in which a control signal is output to the discharge pulse control unit 52 on the basis of the discharge period input through the operation panel 58 to control the discharge period at which the pulse voltage is generated by the processing power source unit 44;

(2) a moving speed control operation as the moving speed control means in which the rotational speeds of the X-axis servo motor 10 and the Y-axis servo motor 12 are so controlled that the actual inter-electrode voltage detected by the discharge detection circuit 56 is equal to the target inter-electrode voltage which is input through the operation panel 58 to control the moving speed of the movable table 4 and the workpiece 2;

(3) a processing shape control operation for controlling the driving of the X-axis servo motor 10 and the Y-axis servo motor 12 in accordance with information on the processing shape of the workpiece 2 which is input through the operation panel 58;

(4) a processing liquid circulating control operation for circulating the processing liquid 6 by driving the pump 14;

(5) a wire electrode moving control operation for moving the wire electrode by driving the wire electrode motor 34 and the tension roller 36; and (6) a breakage preventing control operation for the wire electrode for outputting a control signal to the discharge pulse control unit 52 on the basis of the discharge period and the target inter-electrode voltage input through the operation panel 58, the discharge information detected by the discharge detection circuit 56 to thereby limit the frequency (number of times) of application of the discharging pulse voltage by the processing power source unit 44.

Of the above various control operations executed in the control device 50, the breakage preventing control operation for the wire electrode, which is a main processing of the invention, will be described.

Upon the start of processing of the workpiece 2, a control signal which corresponds to a discharge period value that was input through the operation panel 58 is output to the discharge pulse control unit 52 to carry out a discharge period setting processing (not shown) for applying a pulse voltage between the wire electrode 24 and the workpiece 2 at the above set period. Thereafter, the breakage preventing processing, as shown in FIGS. 2A and 2B, is carried out and the actual number of times of the discharge is restricted if necessary.

Figure 2A:
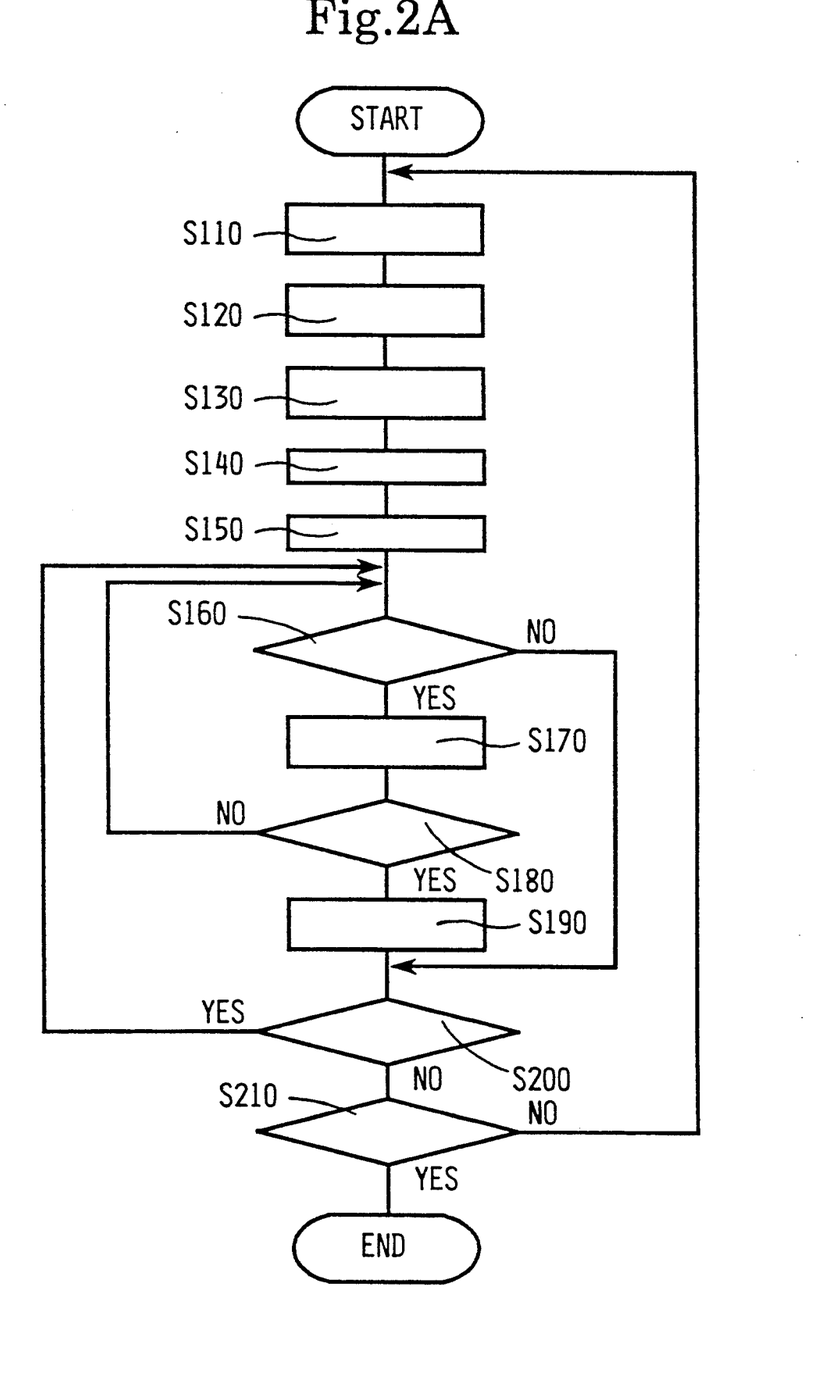
FIG. 2A is a flowchart for a process of preventing the breakage of a wire electrode which is executed in a CPU of the wire electric discharge machine of this embodiment.
Figure 2B:
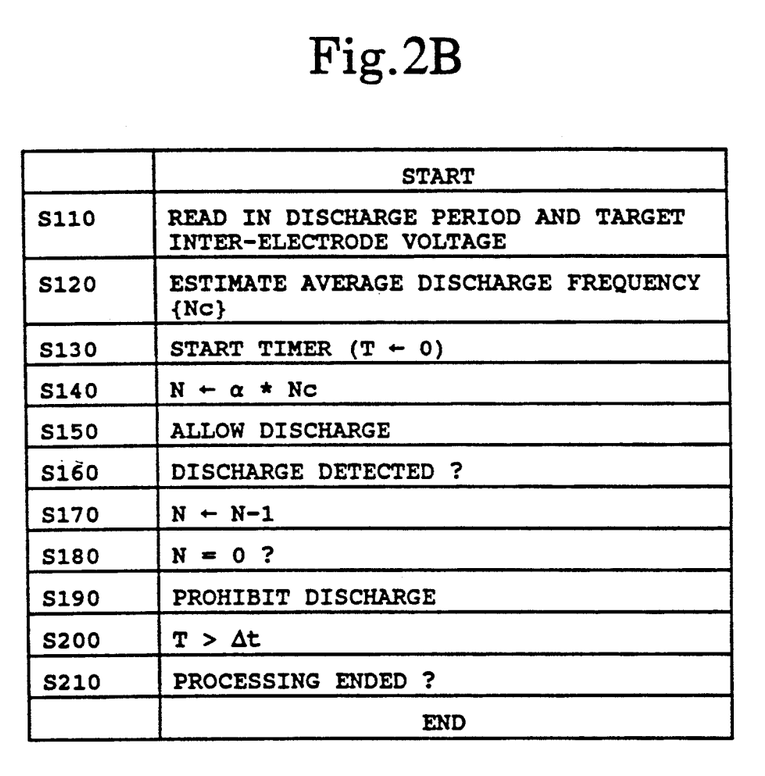
FIG. 2 is a table of labels for FIG. 2A.
Figure 3:
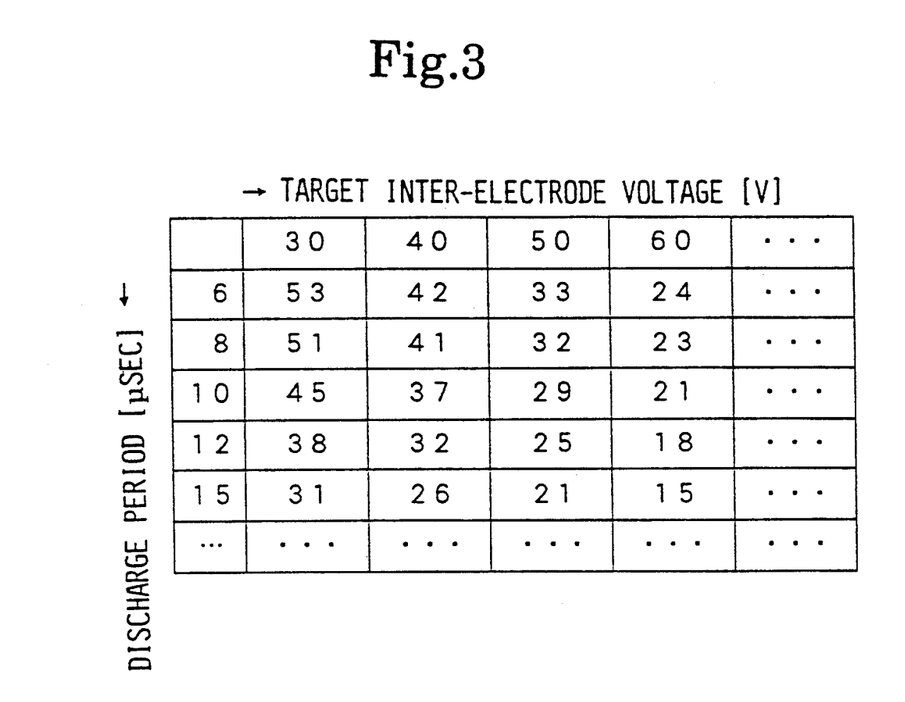
FIG. 3 shows a data table which is stored in a ROM in the wire electric discharge machine of this embodiment.

As shown in FIGS. 2A and 2B, in the breakage preventing processing, the values of the discharge period and the target inter-electrode voltage between the wire electrode and the workpiece, which are initially set through the operation panel 58, are read in at a step S110. At a step S120, a data table which was previously stored in the ROM of the control device 50, and is shown as an example in FIG. 3, is used on the basis of the current discharge period [$\mu$sec.] and target inter-electrode voltage [V], to perform an interpolation calculation, whereby an average discharge frequency (number of times) Nc per unit time $\Delta t$ (set to 500 $\mu$sec. in this embodiment) is estimated.

The reason the average discharge frequency (the average number of times of discharge) Nc is estimated on the basis of the current discharge period and target inter-electrode voltage, at step S120, is that the actual inter-electrode voltage is controlled to be equal to the target inter-electrode voltage through the moving speed control operation, and the distance between the wire electrode 24 and the workpiece 2 increases as the target inter-electrode voltage is increased, so that a non-discharging rate to the application of the discharge pulse voltage is increased. In view of the above, a discrete value for the average discharge frequency for the discharge period and the target inter-electrode voltage that is experimentally determined is set in the data table as shown in FIG. 3.

At step S130, an internal timer T, of the CPU, for counting the unit time $\Delta t$ is cleared and the counting of the unit time $\Delta t$ is started.

At step S140, the average discharge frequency Nc estimated at step S120 is multiplied by a fixed constant (hereinafter referred to as "override value") $\alpha$ to calculate the permissible maximum discharge frequency per unit time $\Delta t$. The value ($\alpha$*Nc) is set to a counter N for counting the actual discharge frequency. Here, the reason for the multiplication of Nc by the override value $\alpha$ is that the actual discharge frequency has a dispersion around the average value, as shown in FIG. 5, and thus, if the Nc value is directly set as the permissible maximum discharge frequency as it is, there would occur cases where the processing speed is excessively reduced in accordance with such a condition because of the dispersion above Nc. If the override value $\alpha$ is excessively large, the breakage preventing effect is depressed, and thus the override value $\alpha$ is preferably set in the range 1 to 1.2. In this embodiment, the override value $\alpha$ is set to 1.1. At step S150, the allowance of the discharge is instructed to the discharge pulse control unit 52.

At step S160, whether the discharge is actually induced is judged on the basis of a signal of discharge detection which is input from the discharge detection circuit 56. If no discharge is detected, the process goes to a step S200 for executing the judgment on the lapse of the unit time $\Delta t$. On the other hand, if the discharge is detected, the process goes to a step S170.

At step S170, the actual discharge frequency is counted by decrementing the counter N. At step S180, it is judged whether the count value of the counter N is zero. If the count value of the counter N is not zero, it is judged that the actual discharge frequency within the unit time $\Delta t$ did not reach the maximum discharge frequency ($\alpha$*Nc) and the process returns to the step S160. If the count value of the counter N is judged to be zero at the step S180, it is judged that the actual discharge frequency within the unit time $\Delta t$ reached the maximum discharge frequency ($\alpha$*Nc) and thus the process goes to a step S190. At the step S190, an instruction for the prohibition of discharge is provided to the discharge pulse control unit 52 so that no discharge is induced and the process goes to step S200.

At the step S200, it is judged on the basis of the value of the internal timer T of the CPU, whether the unit time $\Delta t$ has elapsed since the start of this processing. If $T \leq \Delta t$, the lapse of the unit time $\Delta t$ has not occurred, and the process returns to the step S160. That is, if the counter N=0 is judged at step S180 within the unit time $\Delta t$, the closed-loop processing from the step S160 to S200 is repeatedly executed, because the discharge is prohibited at the step S190, until the lapse of the unit time $\Delta t$ is judged at step S200. If the lapse of the unit time $\Delta t$ is judged at the step S200, the process goes to a step S210.

At step S210, it is determined whether an instruction to end the processing is output from the operation panel 58. If no such instruction is present, the process returns to the step S110 and the above process is repeated. On the other hand, if the end of the processing is instructed, this process ends.

Thus, in the breaking preventing process, step S120 is performed by a discharge frequency estimating means, step S140 is performed by a permissible discharge frequency calculation means, step S160 is performed by a discharge detection means, and the other steps containing the step S190 at their center are performed by a discharge ceasing means.

As described above, according to the wire electric discharge machine of this embodiment, when the actual discharge frequency is judged to exceed the maximum discharge frequency ($\alpha$*Nc) within the unit time $\Delta t$, the discharge is prohibited for the residual time of the unit time $\Delta t$, and the discharge is allowed when a counting of a next unit time $\Delta t$ is started, so that the unnecessary reduction of the processing speed can be avoided and the abnormal concentration of the discharge can be prevented. Therefore, the breakage of the wire electrode can be prevented while minimizing the reduction in the processing speed. In addition, even if the processing conditions are altered during processing, the maximum discharge frequency per unit time is renewed in accordance with the above alteration so that the optimum breaking preventing effect can be obtained.

The data table stored in the ROM of the control device, which is used in the wire electric discharge machine of this embodiment, covers only the information on the discharge period and target inter-electrode voltage. However, in addition to the above two pieces of information, it may cover other information such as that on material of the wire electrode, wire tension, and wire feeding speed. With this additional information, a finer breaking preventing control operation can be carried out. Further, the data table for directly calculating the average discharge frequency Nc may not be stored in the RAM, rather constants for calculating the average discharge number Nc through algebraic calculations on the basis of information on the set discharge period, the set target inter-electrode voltage, and information on the wire electrode may be stored therein. The average discharge frequency Nc can be calculated with the constants through algebraic calculations. In this case, saving of the ROM capacity is possible.

Further, the above embodiment relates to a wire electric discharge machine for controlling the moving speed of the movable table 4 so that the inter-electrode voltage between the wire electrode 24 and the workpiece 2 is made equal to the target inter-electrode voltage. However, the same effect as described above can be obtained even when this invention is applied to a wire electric discharge machine for controlling the moving speed of the movable table 4 to a constant speed on the basis of the feeding speed which is previously set. In this case, in the breakage preventing process for the wire electrode, in place of the target inter-electrode voltage, the inter-electrode voltage detected by the discharge detection circuit 56 may be read in at the step S110 and the inter-electrode voltage thus detected may be used in place of the target inter-electrode voltage when the average discharge frequency Nc is estimated at the step S120.

As described above, according to the wire electric discharge machine of the invention, in order to prevent the discharge from being concentrated and prevent the processing speed from being undesirably reduced, the maximum permissible discharge frequency is calculated, and the discharge is prohibited for the residual time of a prior-set unit time when the discharge exceeding the maximum permissible discharge frequency occurs within the unit time so that an improved wire electrode breakage prevention can be obtained while minimizing the reduction of the processing speed to avoid breakage of the wire electrode.

What is claimed is:

1. A wire electric discharge machine for repetitively inducing pulse-shaped discharge between the wire electrode and the workpiece, to perform a processing of the workpiece comprising:

processing condition setting means for setting information on a workpiece and processing conditions;

discharge control means for applying a pulse-shaped voltage between a wire electrode and the workpiece on the basis of a discharge period which is set by the processing condition setting means;

inter-electrode voltage detection means for detecting an average inter-electrode voltage between the wire electrode and the workpiece;

relative-movement means for relatively moving the wire electrode and the workpiece; and moving speed control means for controlling the relative moving speed between the wire electrode and the workpiece so that a one of the average inter-electrode voltage detected by the inter-electrode voltage detection means is made equal to the target inter-electrode voltage set in the processing condition setting means, and the relative moving speed between the wire electrode and the workpiece is made equal to a feeding speed set in the processing condition setting means;

wherein the moving speed control means includes discharge frequency estimating means for estimating an average number of times of discharge per unit time on the basis of a one of the target inter-electrode voltage which is set by the processing condition setting means when the moving speed control means controls the relative moving speed so that the average inter-electrode voltage is equal to the target inter-electrode voltage and the average inter-electrode voltage which is detected by the inter-electrode voltage detection means when the moving speed control means controls the relative moving speed to be equal to the feeding speed set by the processing condition setting means, and the discharge period which is set by the processing condition setting means;

permissible discharge-frequency generating means for generating the permissible maximum number of times of discharge per unit time on the basis of the average number of times of discharge per unit time which is estimated by the discharge frequency estimating means;

discharge detection means for detecting discharge which is actually induced between the wire electrode and the workpiece; and discharge ceasing means for counting the number of times of the discharge which is detected by the discharge detection means every unit time and for ceasing the application of the pulse-shaped voltage by the discharge control means for a residual time of the unit time when the counted number of times of the discharge reaches the permissible number of times of the discharge which is generated by the permissible discharge frequency generating means.

2. A method for preventing the breakage of a wire electrode of a wire electric discharge machine, comprising the steps of:

setting a discharge period and an initial inter-electrode voltage, the initial inter-electrode voltage establishing a current inter-electrode voltage;

generating an average discharge frequency per unit time on the basis of the discharge period and the current inter-electrode voltage;

initiating a time count to count the unit time;

adjusting the average discharge frequency to a maximum discharge frequency;

counting a number of times of an actual a discharge;

determining when the number of times of an actual discharge exceeds the maximum discharge frequency in the unit time; and preventing further discharges during a residual time of the unit time when the number of times of the actual discharge exceeds the maximum discharge frequency.

3. The method as claimed in claim 2, wherein multiplying the average discharge frequency by a factor constitutes the adjusting step.

4. The method as claimed in claim 3, wherein said factor lies in a range from 1.0 to 1.2.

5. The method as claimed in claim 2, further comprising reiterating the generating through determining steps for each unit time so long as cutting with the wire electrode continues.

6. The method as claimed in claim 5, further comprising a step of detecting an average inter-electrode voltage per unit time for use as the current inter-electrode voltage at a next subsequent unit time.

7. A wire electric discharge machine comprising:

means for setting a discharge period and an initial inter-electrode voltage, the initial inter-electrode voltage establishing a current inter-electrode voltage;

means for calculating an average discharge frequency per unit time on the basis of the discharge period and the current inter-electrode voltage;

means for initiating a time count to count down the unit time;

means for adjusting the average discharge frequency to a maximum discharge frequency;

means for counting actual discharges;

means for determining when the actual discharges exceed the maximum discharge frequency in the unit time; and means for preventing further discharges during a residual time of the unit time when the count of actual discharges exceeds the maximum discharge frequency.

8. The apparatus as claimed in claim 7, wherein multiplying the average discharge frequency by a factor is performed by the means for adjusting.

9. The wire electric discharge machine as claimed in claim 8, wherein said factor lies in a range from 1.0 to 1.2.

10. The wire electric discharge machine as claimed in claim 5, further comprising means for detecting an average inter-electrode voltage per unit time for use as the current inter-electrode voltage at a next subsequent unit time.

* * * * *